United States Patent
Yasuhara

(10) Patent No.: US 10,305,961 B2
(45) Date of Patent: May 28, 2019

(54) INFORMATION PROCESSING APPARATUS, INFORMATION PROCESSING APPARATUS CONTROL METHOD, AND STORAGE MEDIUM STORING PROGRAM

(71) Applicant: CANON KABUSHIKI KAISHA, Tokyo (JP)

(72) Inventor: Hiroshi Yasuhara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 14/877,131

(22) Filed: Oct. 7, 2015

(65) Prior Publication Data

US 2016/0112493 A1    Apr. 21, 2016

(30) Foreign Application Priority Data

Oct. 17, 2014    (JP) .................................. 2014-212883

(51) Int. Cl.
*H04L 29/06* (2006.01)
*H04L 29/08* (2006.01)

(52) U.S. Cl.
CPC ............ *H04L 67/025* (2013.01); *H04L 63/10* (2013.01)

(58) Field of Classification Search
CPC .............................. H04L 67/025; H04L 63/10
See application file for complete search history.

(56) References Cited

U.S. PATENT DOCUMENTS

| | | | |
|---|---|---|---|
| 9,098,369 B1* | 8/2015 | Lewis | G06F 8/61 |
| 9,191,455 B2* | 11/2015 | Kawabata | H04L 67/02 |
| 2010/0171973 A1* | 7/2010 | Kimura | G06F 3/1204 358/1.14 |
| 2011/0067090 A1* | 3/2011 | Osaki | G06F 21/608 726/4 |
| 2013/0061149 A1* | 3/2013 | Ikeda | G06F 3/04817 715/738 |

FOREIGN PATENT DOCUMENTS

| | | |
|---|---|---|
| JP | 2008282216 A | 11/2008 |
| JP | 2011076621 A | 4/2011 |
| JP | 2013054435 A | 3/2013 |

OTHER PUBLICATIONS

Office Action issued in Japanese Appln. No. 2014-212883 dated Aug. 10, 2018.

* cited by examiner

*Primary Examiner* — Michael A Keller
(74) *Attorney, Agent, or Firm* — Rossi, Kimms & McDowell LLP

(57) ABSTRACT

An information processing apparatus capable of requesting a server to execute an application on the server acquires user information, and determines whether execution of the application by a user corresponding to the user information is permitted. The information processing apparatus controls display of a screen for instructing execution of the application to, when it is determined that execution of the application is permitted, display the screen on a display unit, and when it is determined that execution of the application is inhibited, restrict an instruction to execute the application.

19 Claims, 14 Drawing Sheets

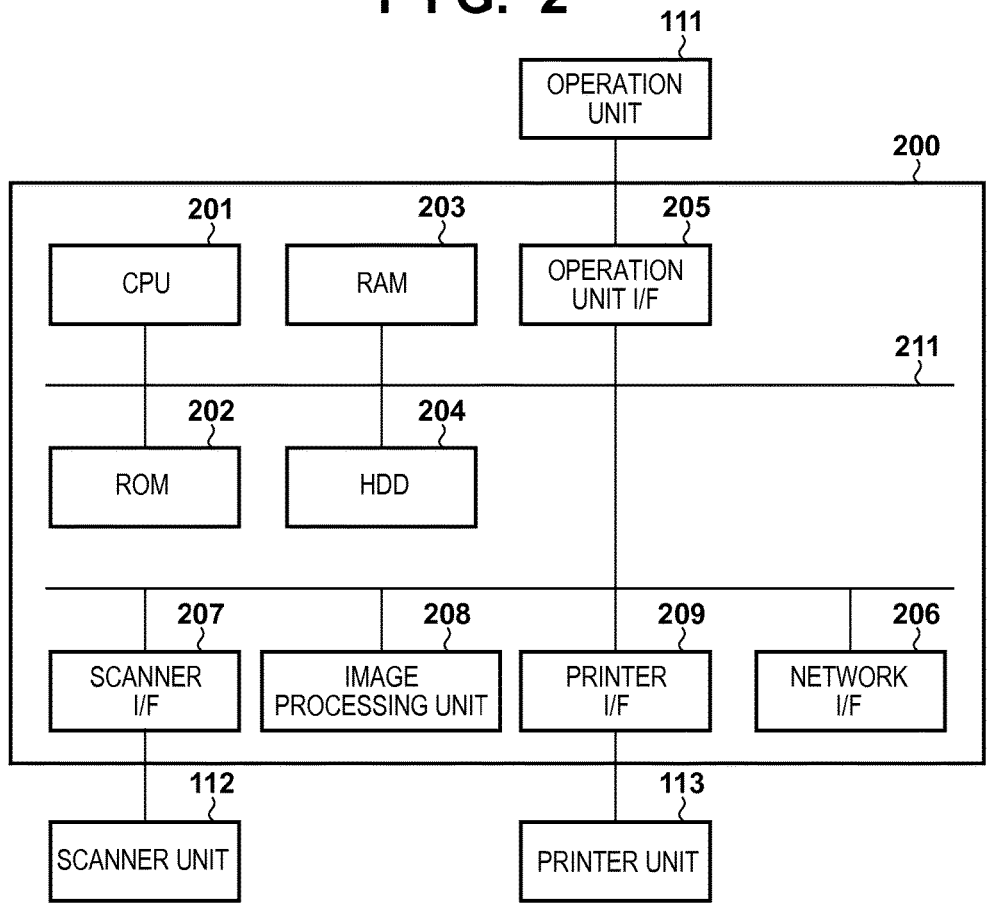
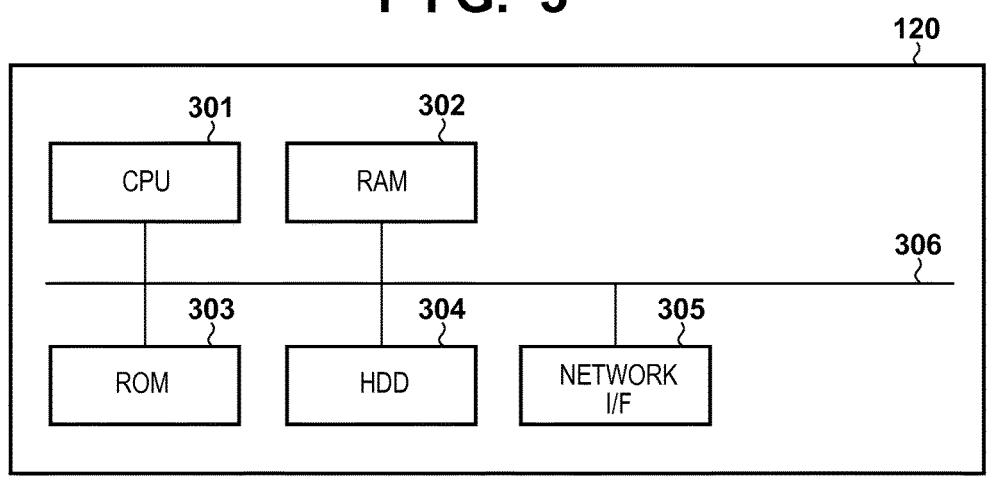

| APPLICATION ID | APPLICATION ENCRYPTION COMMON KEY |
|---|---|
| APP001 | OhVyoiuARmcu······ |
| APP002 | WasilDcQR6dYj······ |
| APP003 | tjoE1ijp321rAeh······ |
| ... | ... |

FIG. 6

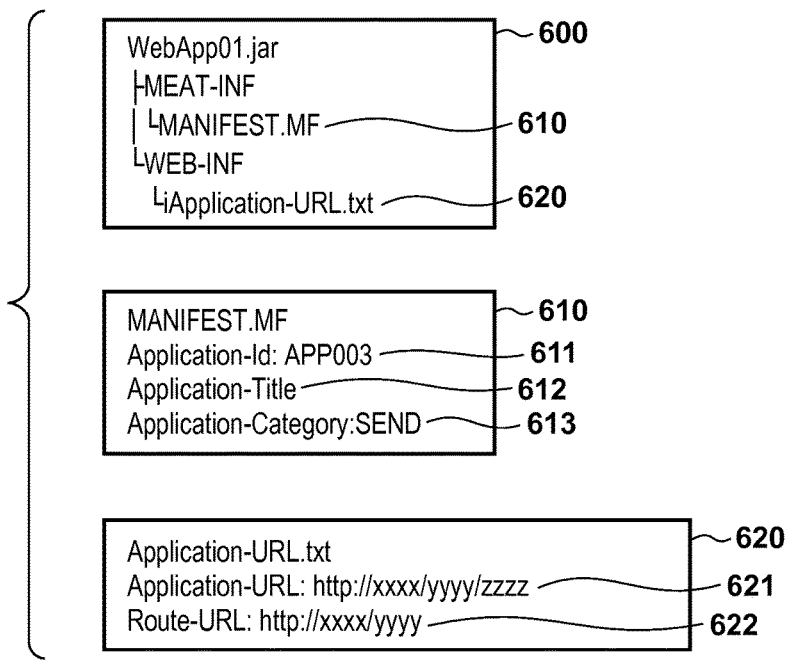

```
WebApp01.jar                              ~600
 ├MEAT-INF
 |  └MANIFEST.MF ─────────────610
 └WEB-INF
    └iApplication-URL.txt ─────620
```

```
MANIFEST.MF                               ~610
Application-Id: APP003 ──────611
Application-Title ───────────612
Application-Category:SEND ───613
```

```
Application-URL.txt                       ~620
Application-URL: http://xxxx/yyyy/zzzz ──621
Route-URL: http://xxxx/yyyy ─────────────622
```

FIG. 7

| APPLICATION ID | LICENSE ACCESS NUMBER | EXPIRATION DATE | DEVICE ID | LICENSE ID |
|---|---|---|---|---|
| APP001 | XXX-XXX-101 | INDEFINITE | - | - |
| APP001 | XXX-XXX-102 | INDEFINITE | DEV001 | LIC001 |
| APP002 | XXX-XXX-201 | 60 DAYS | DEV001 | LIC002 |
| ... | ... | ... | ... | ... |

706 ~ (row APP001 / XXX-XXX-101)
707 ~ (row APP001 / XXX-XXX-102)

701  702  703  704  705

```
LICENSE ID : LIC002
APPLICATION ID : APP002
DEVICE ID : DEV002
EXPIRATION DATE : 60
APPLICATION ENCRYPTION COMMON KEY : WasiIDcQR6dYj······
```

FIG. 11

| 1100 | APPLICATION ID 1101 | Title 1102 | URL 1103 | EXPIRATION DATE 1104 | LICENSE ID 1105 | LICENSE ID 1106 | Function Category 1107 | Route URL 1108 |
|---|---|---|---|---|---|---|---|---|
| 1109 | APP001 | COPY | | INDEFINITE | LIC001 | - | COPY | |
| 1110 | APP002 | Scan WebApp | http://xxx/yyy/zzz.html | 20140501 | LIC002 | | Scan to SMB | http://xxx/yyy |
| | APP003 | Print WebApp | http://aaa/bbb | INDEFINITE | LIC003 | | PRINT | http://aaa |
| | APP004 | SEND | | INDEFINITE | LIC004 | | Scan to E-mail | |
| | APP005 | BOX | | INDEFINITE | LIC005 | | PRINT | |
| | | | | | | | | |

FIG. 13

| | 1301 | 1302 | 1303 | 1304 | 1305 | 1306 |
|---|---|---|---|---|---|---|
| 1300 | UserID | Role | COPY | PRINT | Scan to E-mail | Scan to SMB |
| | UserA | General User | Permit | Permit | Deny | Deny |
| | UserB | Administrator | Permit | Permit | Permit | Permit |

FIG. 14

<Login>

UserID [_____] ~1401

Password [_____] ~1402

[Login] ~1403

~1400

FIG. 15
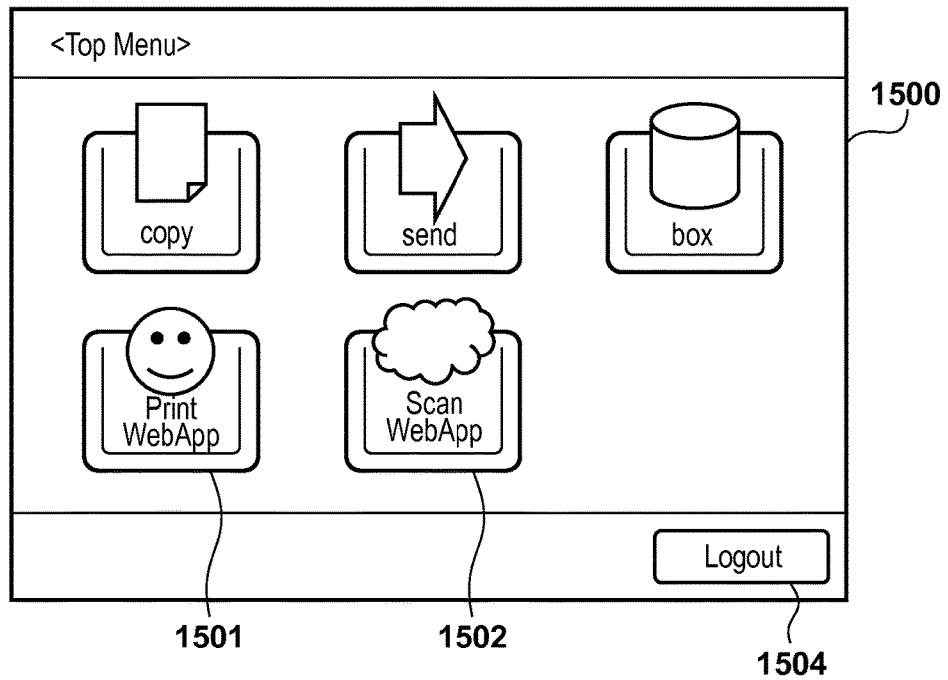
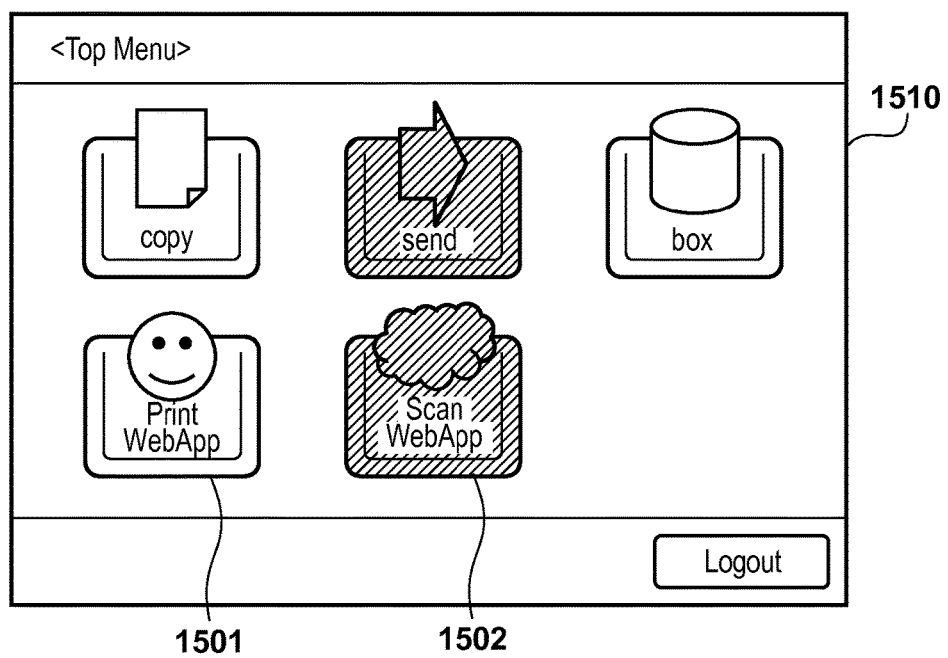

INFORMATION PROCESSING APPARATUS, INFORMATION PROCESSING APPARATUS CONTROL METHOD, AND STORAGE MEDIUM STORING PROGRAM

BACKGROUND OF THE INVENTION

Field of the Invention

The present invention relates to an information processing apparatus that can communicate with a web server and includes a web browser capable of displaying an operation screen provided by the web server, a control method, and a storage medium storing a program.

Description of the Related Art

It is known that an information processing apparatus such as a PC is connected to a web server on a network and displays, on a web browser, an operation screen provided by a web application on the web server.

In this case, first, the web browser of the information processing apparatus requests an operation screen of the web application on the web server. In accordance with the request from the information processing apparatus, the web application sends back, as a response to the information processing apparatus, HTML data for displaying an operation screen on the web browser. The web browser of the information processing apparatus analyzes received HTML data, and displays an operation screen based on the description of the HTML data. Further, when the user inputs an instruction via the operation screen displayed on the web browser, the web browser notifies the web server of the input instruction. Upon receiving this notification, the web application on the web server executes processing complying with the input instruction. Recently, some MFPs (Multi Function Peripherals) having the scanner function, printer function, and the like include the above-mentioned web browser.

There is known an MFP in which a web browser on the MFP has a function of registering a web site registered in bookmarks as a shortcut button in the main menu (Japanese Patent Laid-Open No. 2013-54435). This allows the user to directly access a target web application from the main menu, similar to a normal application, instead of accessing the web application from a menu on the web browser. It is also known to restrict access to a function provided by the MFP in accordance with the user authority (Japanese Patent Laid-Open No. 2011-76621).

When executing the access restriction on a function provided by an MFP, it is desirable to perform the access restriction not on a function implemented on the MFP but on a function implemented by a web application. However, the shortcut button of a bookmark holds only URL information without considering the type of a function implemented by a connection destination web application, so no appropriate access restriction can be executed.

For example, whether the web application has the print function or a function of transmitting a scanned image cannot be determined from URL information. It is considered that even a user having an access restriction on transmission of a scanned image can implement the transmission via a web application and security issues arise. If the access to the browser function is restricted, the access is restricted regardless of the function of a web application. For example, the access restriction on a web application having a scanned image transmission function can be executed, but the access to a web application having the print function cannot be executed, impairing convenience.

When a user can access an arbitrary web application via a web browser, he can connect to a URL he wants, without the intervention of the shortcut button, and no proper access restriction can be executed.

SUMMARY OF THE INVENTION

An aspect of the present invention is to eliminate the above-mentioned problems with the conventional technology. The present invention provides an information processing apparatus that appropriately restricts execution of an application on a server, a control method, and a storage medium storing a program.

The present invention in one aspect provides an information processing apparatus capable of requesting a server to execute an application of the server, comprising: an acquisition unit configured to acquire user information; a determination unit configured to determine, based on the user information acquired by the acquisition unit, whether execution of the application by a user corresponding to the user information is permitted; and a display control unit configured to control display of a screen for instructing execution of the application to, in a case where the determination unit determines that execution of the application by the user is permitted, display the screen on a display unit, and in a case where the determination unit determines that execution of the application by the user is inhibited, restrict an instruction to execute the application.

According to the present invention, execution of an application on a server can be appropriately restricted.

Further features of the present invention will become apparent from the following description of exemplary embodiments with reference to the attached drawings.

BRIEF DESCRIPTION OF THE DRAWINGS

FIG. 2 is a block diagram showing the hardware arrangement of an MFP;

FIG. 3 is a block diagram showing the hardware arrangement of a license management server;

FIG. 6 is a view showing the configuration of a dummy application and the contents of each setting file;

FIG. 7 is a table showing a license management table;

FIG. 11 is a table showing an application management table;

FIG. 13 is a table showing an access restriction information table;

FIG. 14 is a view showing an authentication screen;

FIG. 15 is a view showing a menu application displayed on the MFP;

DESCRIPTION OF THE EMBODIMENTS

Figure 1:
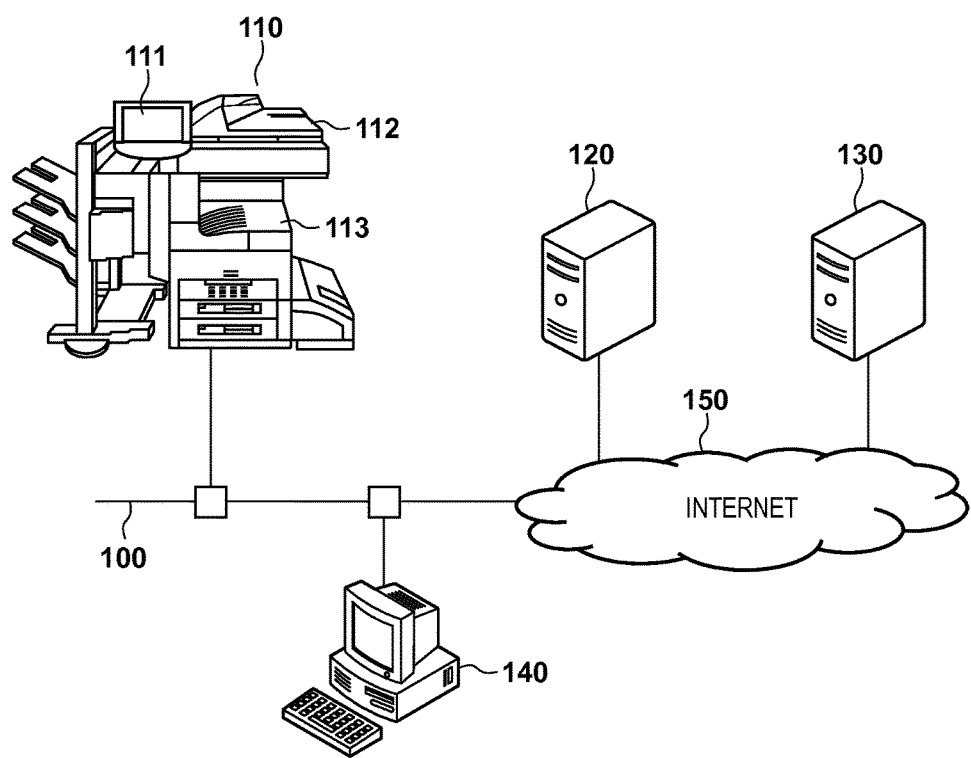
FIG. 1 is a view showing the arrangement of a system including an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[System Arrangement]

FIG. 1 is a view showing the arrangement of a system including an information processing apparatus. This embodiment will exemplify an MFP (MultiFunctional Peripheral) including a web browser as a client terminal (information processing apparatus) that displays a web application. The MFP is an apparatus in which a plurality of functions such as the print function and scan function are integrated. In this embodiment, the MFP can execute an application already implemented on the MFP and in addition, can request execution of a web application implemented on a web server on a network such as a cloud network. For example, when an instruction to execute a web application is accepted from a user on the MFP, the MFP requests the web server to execute the web application, and then is controlled from the web server in regard to execution of the print function, scan function, or the like.

As shown in FIG. 1, an MFP 110 and a PC 140 are connected via a LAN 100 formed from Ethernet® or the like so that they can communicate with each other. The LAN 100, a license management server 120, and a web application server 130 are connected to Internet 150. The web application server 130 corresponds to the above-described web server.

The MFP 110 includes an operation unit 111, a scanner unit 112, and a printer unit 113. In this embodiment, the MFP 110 operates as a client terminal that displays a web application function operation screen by using a web browser, and accepts a user operation. The MFP 110 can control the printer unit 113 to print an image acquired from a web application, and control the scanner unit 112 to transmit a scanned image to a web application. In this embodiment, an identifier called a device ID is assigned to the MFP 110 so that an external apparatus which manages the MFP 110 can uniquely identify the individual.

The license management server 120 is a server that manages the licenses of a plurality of different web applications. The web application server 130 is a server that executes a web application. The PC 140 is a terminal apparatus for making setting of the MFP 110. The setting includes, for example, installation of a web application in the MFP 110 by the PC 140.

In the system according to this embodiment, the number of building devices mentioned above and their install locations are not limited. For example, the web application server 130 may be connected not to the Internet 150 but to the LAN 100. The LAN 100 may be a wired network or a wireless network.

[Hardware Arrangement of MFP 110]

FIG. 2 is a block diagram showing the hardware arrangement of the MFP 110 shown in FIG. 1.

The operation unit 111 is constituted by a touch panel display or the like, and has a function of displaying apparatus information and function information to a user, and accepting a function execution instruction operation from a user. The scanner unit 112 performs an optical reading operation for an image on an original set on a platen glass or supplied from an ADF (Automatic Document Feeder), and creates image data. The printer unit 113 forms an image on paper (printing medium) based on image data received from a controller 200. The printer unit 113 forms an image on paper by, for example, an inkjet printing method or an electrophotographic printing method.

The controller 200 is electrically connected to the operation unit 111, the scanner unit 112, and the printer unit 113, and is also connected to the LAN 100 via a network interface (I/F) 206. This enables communication with an apparatus on the LAN 100 by a communication protocol such as TCP/IP.

A CPU 201 performs centralized control of the MFP 110 based on a control program or the like stored in a ROM 202. The CPU 201 also performs centralized control of various processes that are performed inside the controller 200. For example, the CPU 201 executes a program for implementing each flowchart according to this embodiment. The boot program and control program of the apparatus, and the like are stored in the ROM 202. A RAM 203 is used as a system work memory for operating the CPU 201, and is also used as a memory for temporarily storing image data, setting data, and the like. An HDD (Hard Disk Drive) 204 stores, for example, system software, image data, and data necessary for operating the system.

An operation unit I/F 205 is an interface unit for connecting a system bus 211 and the operation unit 111. The network I/F 206 connects the LAN 100 and the system bus 211 and performs transmission/reception of data. A scanner I/F 207 performs image processes such as correction, processing, and editing on image data received from the scanner unit 112.

An image processing unit 208 performs image processes such as image data direction change, image compression, and decompression processing. A printer I/F 209 receives image data having undergone image processing by the image processing unit 208, and outputs the image data to the printer unit 113 while referring to attribute data of the image data.

In this embodiment, a network MFP capable of displaying a UI is used as the MFP 110, but an information processing apparatus such as a general-purpose computer, other than the network MFP, is usable.

[Hardware Arrangement of License Management Server 120, Web Application Server 130, and PC 140]

FIG. 3 is a block diagram showing the hardware arrangement of the license management server 120 shown in FIG. 1. In FIG. 3, a CPU 301, a RAM 302, a ROM 303, a hard disk drive (HDD) 304, and a network I/F 305 are connected via a system bus 306 so that they can communicate with each other.

Programs such as an operating system and applications are stored in the ROM 303 or the HDD 304. The CPU 301 implements a function executable by the apparatus by loading a program from the ROM 303 or the HDD 304 to the RAM 302 and executing it. The CPU 301 communicates with another apparatus on the network via the network I/F 305. The hardware arrangements of the web application server 130 and PC 140 are also the same as that of the license management server 120 in FIG. 3.

[Software Arrangement of License Management Server 120]

Figures 4, 5:
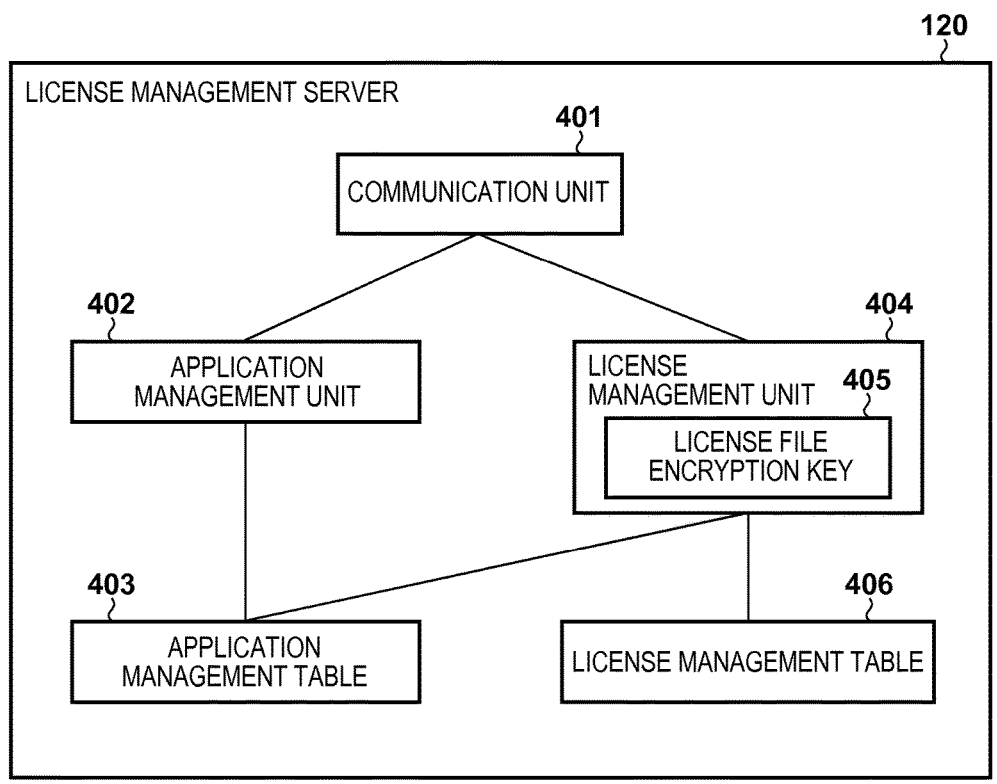
FIG. 4 is a block diagram showing the software module arrangement of a license management server.
FIG. 5 is a table showing an application management table.

FIG. 4 is a block diagram showing the arrangement of the software modules of the license management server 120. These software modules are stored in the HDD 304 of the license management server 120, loaded to the RAM 302, and executed by the CPU 301.

In this embodiment, the license management server 120 performs three processes: encryption of an application, issuance of a license for installing an application in each MFP, and issuance of a license access number for managing each license. Applications include the following two types. One is an MFP application that can be installed in the MFP 110 and represents an execution file group executable on the MFP 110. The other is a dummy application representing a setting file group for registering a web application in the MFP 110. The dummy application will be described later.

A communication unit 401 is a software module for accepting processing requests from an external apparatus, and distributing the processing requests to an application management unit 402 and a license management unit 404 in accordance with the accepted processing requests.

The application management unit 402 is a software module that receives an application before encryption and encrypts the application. The application management unit 402 receives an application from an application development vendor via a terminal (not shown) connected to the Internet. Then, the application management unit 402 generates an application ID and an application encryption common key, and registers them in an application management table 403. The application ID is an identifier for uniquely identifying each application. The application encryption common key is an encryption key for encrypting an application. The application management unit 402 encrypts the application by using the application encryption common key, and sends it back as a response to the requesting source together with the application ID.

The application management table 403 is a database table in which an application ID and application encryption common key generated by the application management unit 402 are saved.

FIG. 5 is a table showing an example of the application management table 403. A column 501 represents an application ID. A column 502 represents an application encryption common key. When the application management unit 402 performs encryption of an application, all data other than a manifest file 610 shown in FIG. 6 are encrypted and created into one file.

Referring again to FIG. 4, the license management unit 404 is a software module for performing issuance of a license for installing an application in each MFP, and management of a license access number for performing issuance of a license. When a request to issue a license access number corresponding to an application to be sold is received from a vendor who sells the application, the license management unit 404 issues a license access number corresponding to an application ID. The license management unit 404 then registers the license access number in a license management table 406. The license access number is a number for uniquely managing one license of an application, and the application vendor sells the above-described encrypted application and the license access number together.

When a license access number and a device ID are received from an application buyer, the license management unit 404 issues a license. The issuance of the license is processing of creating a license file corresponding to the license access number by looking up the application management table 403 and the license management table 406.

The license management unit 404 first acquires an application ID based on the license access number, and acquires an application encryption common key based on the application ID. Then, the license management unit 404 issues a license ID, and registers a device ID and a license ID in the license management table 406. The license management unit 404 creates one file as a license file from these pieces of information. The license management unit 404 encrypts the created license file by using a license file encryption key 405 held in the license management unit 404, and sends it back as a response to the requesting source. The license file encryption key 405 is a public key in the public key cryptography. A corresponding private key is included in the software of the MFP 110. The license management table 406 is a database table in which information about a license is saved.

FIG. 6 is a view showing an example of the configuration of the dummy application and the contents of each setting file. A file 600 is a dummy application main body, and has a structure in which hierarchical folders and files are combined into one file.

The file 610 is a manifest file in which the explanation of the application is described. A file 620 is a file in which a URL for using the web application server 130 is described. In the case of the MFP application, the execution file of a program executable by the MFP 110 is included, unlike the dummy application shown in FIG. 6.

Information 611 is an application ID, and is information for uniquely identifying an application. Information 612 is information representing the name of the application. Information 613 is information representing the function category of an application, and is information representing a function supported by the application. As is apparent from FIG. 6, this application has a SEND function. Information 621 is URL information of the application, and a URL for using the web application server 130 is described. Information 622 is the route URL of the application, and information representing the route layer of the URL at which the web application is implemented is described.

FIG. 7 is a table showing an example of the license management table 406. A column 701 represents an application ID. A column 702 represents a license access number. A column 703 represents the expiration date of the license by the number of days. The number of days indicates the number of days during which the license is valid after the date and time of installation in the MFP 110. A column 704 represents a device ID for uniquely identifying the MFP 110. A column 705 is a license ID for uniquely identifying a license. A row 706 represents an example of an application for which a license access number has been issued but a license has not been issued yet, and the items of the device ID and license ID are blank. A row 707 represents an example of an application for which a license has been issued, a device ID and license ID have been determined, and the correspondence between an MFP and an application whose license has been issued to the MFP is revealed.

Figures 8, 9:
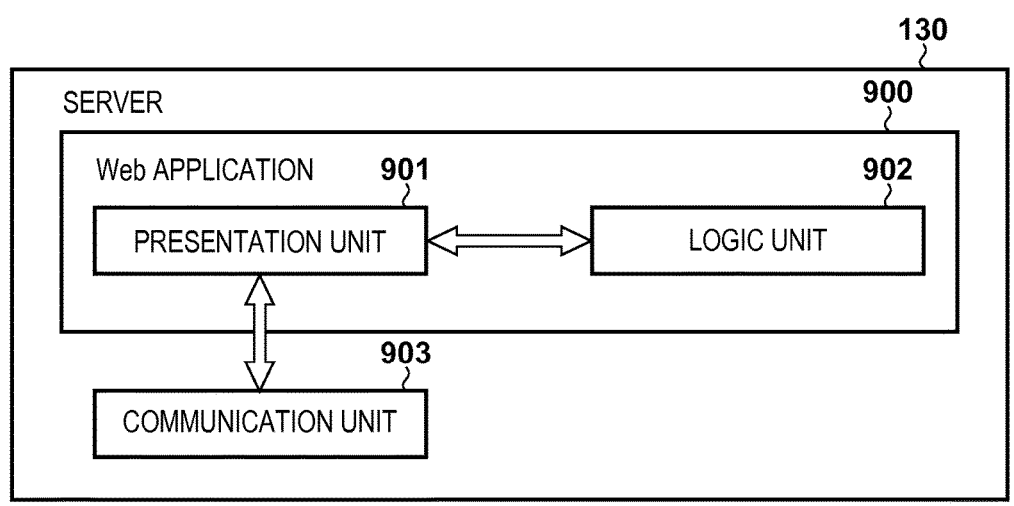
FIG. 8 is a view showing a license file issued by a license management unit.
FIG. 9 is a block diagram showing the software module arrangement of a web application server.

FIG. 8 is a view showing an example of a license file issued by the license management unit 404. As described above, the license file is constituted by pieces of information acquired by the license management unit 404 from the application management table 403 and the license management table 406. In this manner, according to this embodiment, an application buyer can acquire a license file encrypted based on a purchased license access number.

[Software Arrangement of Web Application Server 130]

FIG. 9 is a block diagram showing the arrangement of the software modules of the web application server 130. These software modules are stored in the HDD 304 of the web application server 130 and executed by the CPU 301.

The web application server 130 includes a web application 900 and a communication unit 903. The web application 900 further includes a presentation unit 901 and a logic unit 902.

The presentation unit 901 receives a request from the MFP 110 via the communication unit 903. Further, the presentation unit 901 transmits, as a response to the MFP 110, an operation screen or result screen that should be displayed on a web browser 1000 of the MFP 110. The presentation unit 901 receives, from the MFP 110 via the communication unit 903, information input from the user via the operation screen displayed on the web browser 1000 of the MFP 110.

The logic unit 902 performs processing on the input information from the MFP 110 that has been transferred from the presentation unit 901. For example, the logic unit 902 changes a screen to be displayed in accordance with an input from the user, or creates a processing request for executing the device function (for example, print function or scan function) of the MFP. The communication unit 903 is a software module that controls the network I/F 305 to perform communication using the HTTP protocol.

[Software Arrangement of MFP 110]

Figure 10:
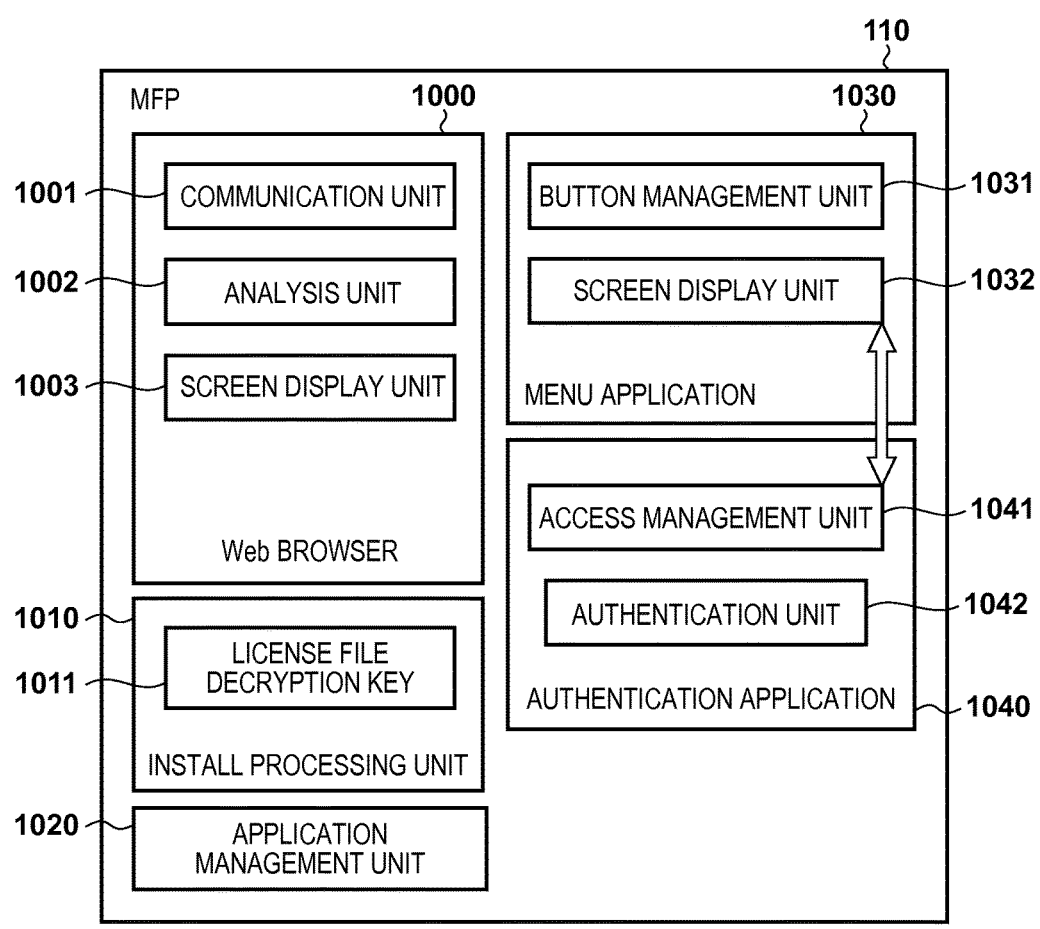
FIG. 10 is a block diagram showing the software module arrangement of the MFP.

FIG. 10 is a block diagram showing the arrangement of the software modules of the MFP 110. These applications and software modules are stored in the HDD 204 of the MFP 110 and executed by the CPU 201.

The MFP 110 includes the web browser 1000, an install processing unit 1010, an application management unit 1020, a menu application 1030, and an authentication application 1040. Each of the web browser 1000, the install processing unit 1010, the application management unit 1020, the menu application 1030, and the authentication application 1040 is implemented by executing a control program by the CPU 201 of the MFP 110. The web browser 1000 has a function of communicating with the web application server 130 to acquire contents and display them on the screen.

The web browser 1000 includes a communication unit 1001, an analysis unit 1002, and a screen display unit 1003. The communication unit 1001 communicates with the web application 900 of the web application server 130 via the network I/F 206 in accordance with the HTTP protocol. For example, the communication unit 1001 transmits information input via an operation screen displayed on the web browser 1000 as a request to the web application 900. The communication unit 1001 receives a response transmitted from the web application 900.

The analysis unit 1002 analyzes the response received from the web application 900. The response includes HTML data serving as a description representing the contents of an operation screen to be displayed on the web browser 1000. Based on the result of analysis by the analysis unit 1002, the screen display unit 1003 displays the HTML data on the operation screen of the operation unit 111, or executes a JavaScript® file on currently displayed contents.

The install processing unit 1010 is a software module that controls installation of an application. The install processing unit 1010 is connected to the PC 140 via the network I/F 206, and executes installation of an application in accordance with an instruction from the PC 140. The install processing unit 1010 includes a license file decryption key 1011 for decrypting an encrypted license file. The license file decryption key 1011 corresponds to the above-mentioned license file encryption key 405.

The application management unit 1020 is a software module that manages an installed application, and includes a license management table for managing an installed application and license file.

The main menu 1030 includes a screen display unit 1032 and a button management unit 1031. The button management unit 1031 saves information of a GUI (Graphical User Interface) button to be displayed on the menu application. The information of the GUI button includes, for example, an image and character string to be displayed on the GUI button, an application that is activated when the GUI button is pressed, and a parameter at the time of activation.

The screen display unit 1032 displays a menu application shown in FIG. 15 in accordance with information of a GUI button registered in the button management unit 1031. When an arbitrary one of GUI buttons displayed on the menu application is selected and pressed by a user operation, an application corresponding to the GUI button is activated.

The authentication application 1040 executes user authentication of the MFP 110. The authentication application 1040 executes authentication processing for identifying a user via an authentication unit 1042, and executes display control processing of validating and invalidating GUI buttons on the menu application via an access management unit 1041.

The authentication unit 1042 executes user authentication of a user. For example, when a user has not been authenticated in the MFP 110, the authentication unit 1042 displays an authentication screen shown in FIG. 14 on the operation unit 111, and accepts input of authentication information from the user via the operation unit 111. The authentication unit 1042 transmits the input authentication information to an external authentication server (not shown) via the network I/F 206, and receives the authentication result. Alternatively, the authentication unit 1042 executes inquiry with user authentication information held in the HDD 204. Another method is also usable for the save destination of authentication information of the user, the algorithm of the authentication, or the input method.

The access management unit 1041 executes access control of a user. The access management unit 1041 refers to access restriction information shown in FIG. 13 for a user authenticated by the authentication unit 1042, and function category information shown in FIG. 11 that is associated with a GUI button on the menu application. The access management unit 1041 executes display control processing of validating or invalidating GUI buttons on the menu application, and displays the menu application shown in FIG. 15.

FIG. 11 is a table showing an example of an application management table 1100 held in the application management unit 1020.

In this table, an application ID 1101, a title 1102 of an application, and URL information 1103 of the application are managed. In addition, an expiration date 1104, license IDs 1105 and 1106, function category information 1107 of the application, and information of a route URL are managed. As the license ID, a plurality of IDs installed in the past are managed to prevent the reuse of a license.

The column 1101 represents an application ID. The column 1102 represents the title name of an application. The column 1103 represents the URL of a web application. This item is registered only when an installed application is a dummy application for a web application. An application for which no URL has been registered is an MFP application. The column 1104 represents the expiration date. The columns 1105 and 1106 represent license IDs.

The column 1107 represents function category information of the application. A column 1108 represents the route URL of the web application. A row 1109 represents that a license LIC001 with an indefinite expiration date is issued for an MFP application "COPY" with an application ID "APP001", and the function category is COPY. A row 1110 represents that a license LIC002 with an expiration date of 20140501 is issued for a web application ScanWebApp with an application ID "APP002", and the function category is Scan to SMB.

[Web Application Registration Processing of MFP 110]

Figure 12:
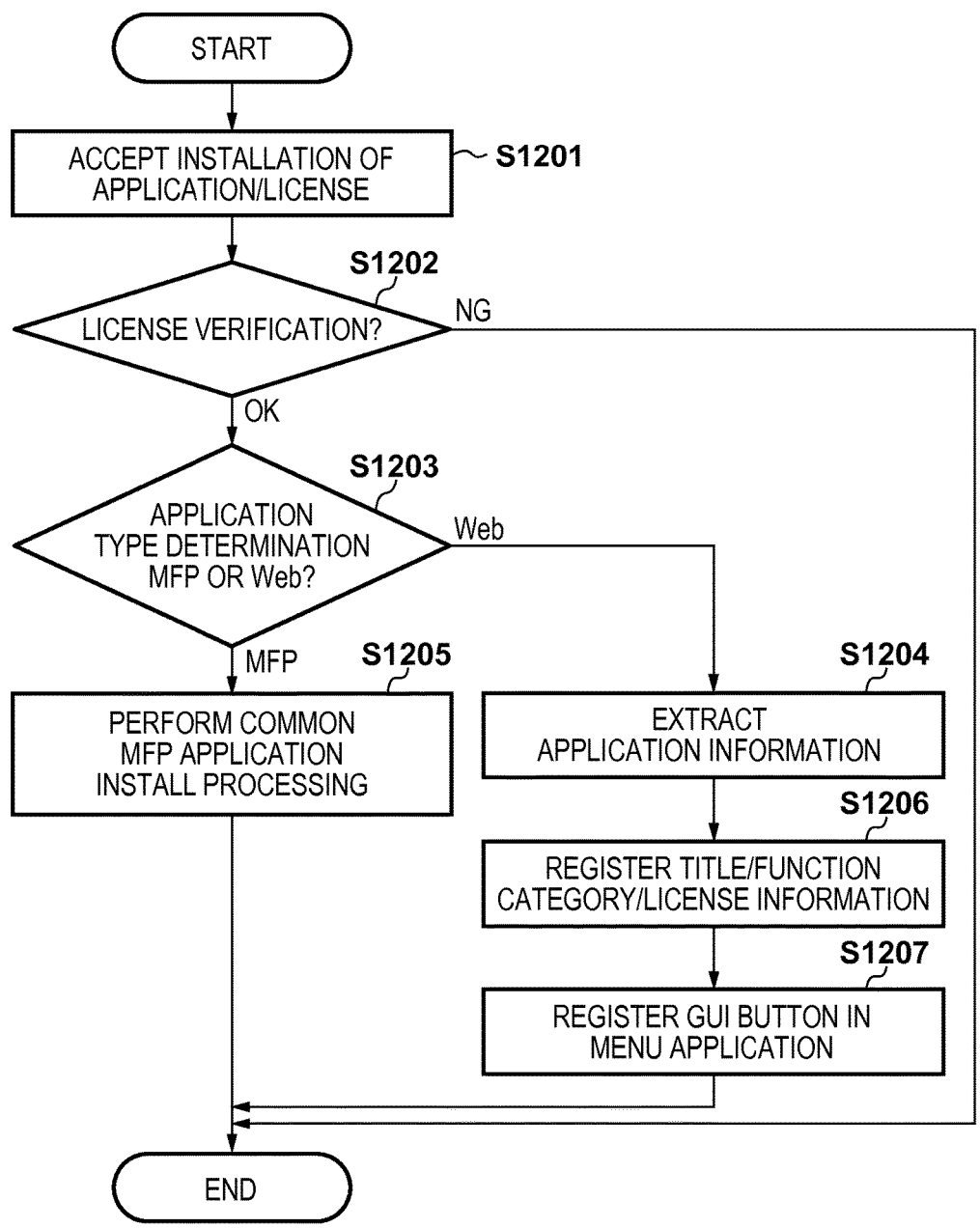
FIG. 12 is a flowchart showing the procedures of web application registration processing of the MFP.

FIG. 12 is a flowchart showing the procedures of web application registration processing of the MFP 110 according to this embodiment. As described above, an application buyer receives an encrypted application and a license access number from an application vendor, and receives a license file from the license management server 120.

This processing starts when the application buyer starts installation of an encrypted application and license file by using the PC 140. Each process in FIG. 12 is implemented by, for example, loading a program stored in the ROM 202 to the RAM 203 and executing it by the CPU 201 of the MFP 110.

Step S1201 is an application and license install acceptance step. When the PC 140 transmits an encrypted application and an encrypted license file to the install processing unit 1010, the install processing unit 1010 receives these files (example of file acquisition). Further, the install processing unit 1010 decrypts the license file by using the license file decryption key 1011. The install processing unit 1010 decrypts the encrypted application by using an application encryption common key included in the decrypted license file, and the process advances to step S1202.

Step S1202 is a license verification step. A device ID described in the decrypted license file and a device ID set in advance for the MFP 110 are compared to determine whether the license file is authentic (these device IDs match each other). If it is determined that the license file is authentic, the decrypted application is transferred to the application management unit 1020 and saved in the HDD 204, and the process advances to step S1203. If it is determined that the license file is inauthentic, the processing in FIG. 12 ends.

Step S1203 is an application type determination step. The application management unit 1020 determines, from the decrypted application, which of an MFP application for which an application file includes an execution file to be executed by the MFP 110, and a dummy application for a web application is the application file. If it is determined that the application file is a dummy application, the process advances to step S1204. If it is determined that the application file is an MFP application, the process advances to step S1205.

Step S1204 is an application information extraction step for the web application. The CPU 201 extracts the URL information 621 and route URL 622 of the web application from the file 620 that is held in the dummy application and describes the URL. Further, the CPU 201 extracts the application ID 611, application title information 612, and application function category information 613 that are held in the manifest file 610. The process then advances to step S1206. In contrast, step S1205 is an MFP application install step. Processing of license information in the case of an MFP application and processing of registration in the menu application are performed. After that, the processing in FIG. 12 ends.

Step S1206 is an application information registration step. Based on the expiration date and the current date and time that are recorded in the license file, the CPU 201 calculates the date and time when the application becomes invalid. Further, the CPU 201 registers, in the application management table 1100, the URL information, route URL, application ID, license ID, function category information, application title information, and expiration date that have been extracted in step S1204.

Step S1207 is a step of registering a GUI button in the menu application. The CPU 201 registers, in the menu application, a GUI button for accessing a web application indicated by the URL extracted in step S1204. For example, the GUI button on the menu application and the URL are associated with each other. The processing in FIG. 12 then ends.

FIG. 13 is a table showing an example of an access restriction information table managed by the access management unit 1041 of the authentication application 1040. This table holds a user identifier 1301, user role (authority) information 1302, and pieces of restriction information 1303 to 1307 for respective functions. As each restriction information, when a function can be used, Permit is registered. To the contrary, when a function cannot be used, that is, is restricted, Deny is registered. For example, UserA in an access restriction information table 1300 has General User authority, and the use of the Scan to E-mail function and Scan to SMB function is restricted. Also, UserB has Administrator authority, and can access all functions.

FIG. 14 is a view showing an example of an authentication screen 1400 displayed on the operation unit 111 of the MFP 110. This screen is displayed by the authentication unit 1042 of the authentication application 1040 when a user has not been authenticated in the MFP 110. A region 1401 is a user ID input field, and accepts input of a user identifier from the user. A region 1402 is a user password input field, and accepts input of a password from the user. A button 1403 is a login button. When the login button is pressed, the authentication unit 1042 executes authentication processing based on pieces of user information input to the user ID field and the password field. When authentication processing succeeds, the UI screen of the menu application 1030 is displayed on the operation unit 111. When authentication processing fails, a warning screen indicative of this is displayed, and the authentication screen 1400 is displayed again.

FIG. 15 is a view showing an example of the menu application 1030 displayed on the operation unit 111 of the MFP 110. A UI 1500 of the menu application displays a list of GUI buttons (icons) each serving as the activation button of each application implemented in the MFP 110, and functions as a launcher. Information of the GUI buttons displayed on the UI 1500 of the menu application is stored in the button management unit 1031 and displayed on the screen by the screen display unit 1032.

The UI 1500 of the menu application includes GUI buttons 1501 and 1502 of web applications. The GUI buttons 1501 and 1502 of the web applications are shortcut buttons for connecting to the URLs of the web applications. When the user presses the GUI buttons 1501 and 1502, the menu application activates the web browser 1000 and transfers URLs associated with the GUI buttons as activation parameters to the web browser 1000. When the web browser 1000 is activated, the URLs associated with the GUI buttons are loaded. That is, the GUI buttons 1501 and 1502 function as the bookmarks of the web applications. A UI 1510 is an example of the display of the UI of the menu application when the access restriction is executed, and has the same arrangement as that of the UI 1500.

The use of Scan to SMB and Scan to E-mail is restricted for UserA. In this embodiment, when the MFP 110 authenticates UserA registered in the access management table, the GUI buttons of these functions are invalidated by gray display or the like by the access management unit 1041 to inhibit pressing of them (inhibit acceptance of an operation). A GUI button 1512 is invalid by gray display. When the MFP 110 authenticates UserB, invalidation of GUI buttons is not executed and all GUI buttons become valid (execution instruction is permitted) because UserB is an administrator and can use all functions.

Although the GUI is displayed in the button display form as shown in FIG. 15 in this embodiment, a GUI display in another form is also available. For example, a subwindow corresponding to a function name or the like is possible instead of each button display.

Figure 16:
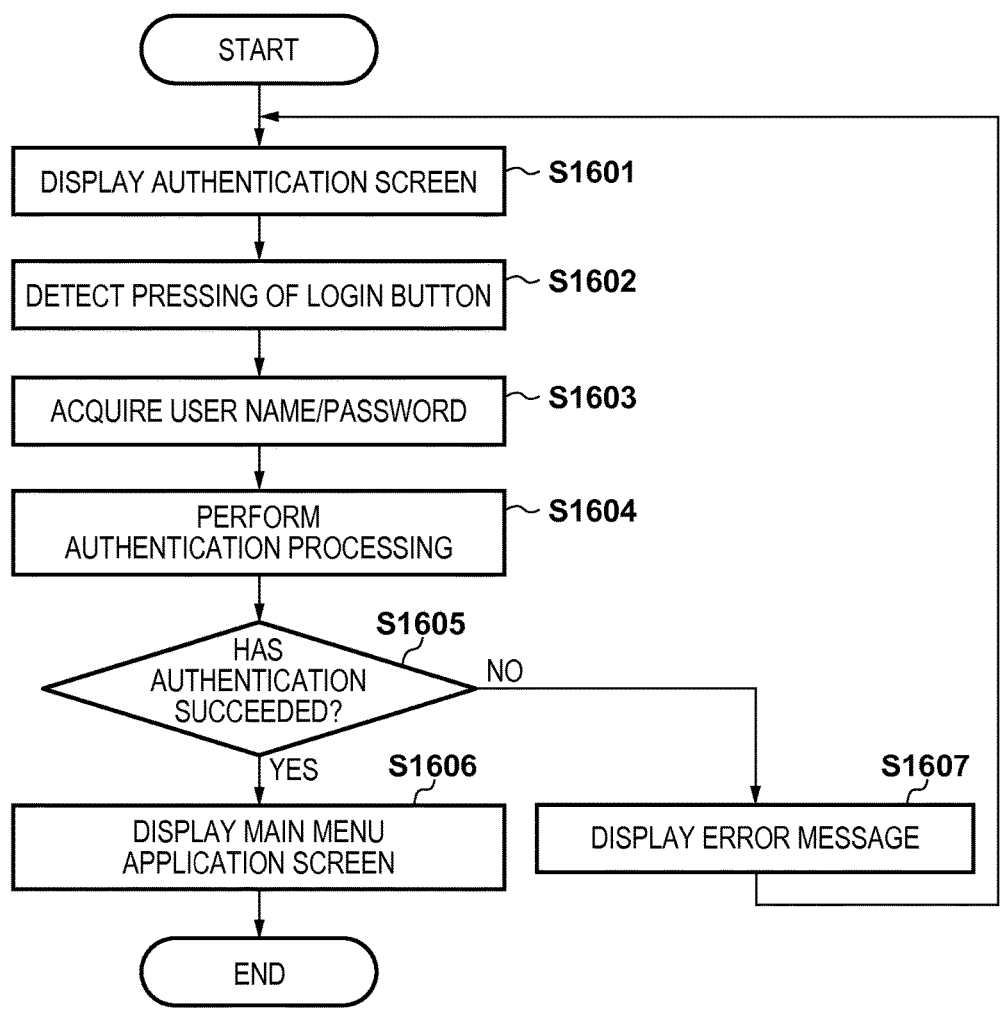
FIG. 16 is a flowchart showing the procedures of display processing by the menu application.

FIG. 16 is a flowchart showing the procedures of processing from authentication by the authentication application 1040 of the MFP 110 up to display of the menu application. Each process in FIG. 16 is implemented by, for example, loading a program stored in the ROM 202 to the RAM 203 and executing it by the CPU 201 of the MFP 110.

Step S1601 is an authentication screen display step. In a state in which a user has not been authenticated in the MFP 110, the authentication screen 1400 is displayed on the operation unit 111. Step S1602 is a login button pressing detection step. The CPU 201 detects that the user has pressed the login button 1403 of the authentication screen 1400.

Step S1603 is a user name/password acquisition step. The CPU 201 acquires the values of an input user ID and password from the user ID input field 1401 and password input field 1402 of the authentication screen 1400. Step S1604 is an authentication processing step. The authentication unit 1042 inquires whether user authentication information held in the HDD 204 of the MFP 110 and the authentication information acquired in step S1603 match each other.

Step S1605 is an authentication success determination step. If it is determined that the inquiry has succeeded, that is, the authentication has succeeded, the process advances to main menu application screen display step S1606. If it is determined that the inquiry has failed, that is, the authentication has failed, the process advances to error message display step S1607.

Figure 17:
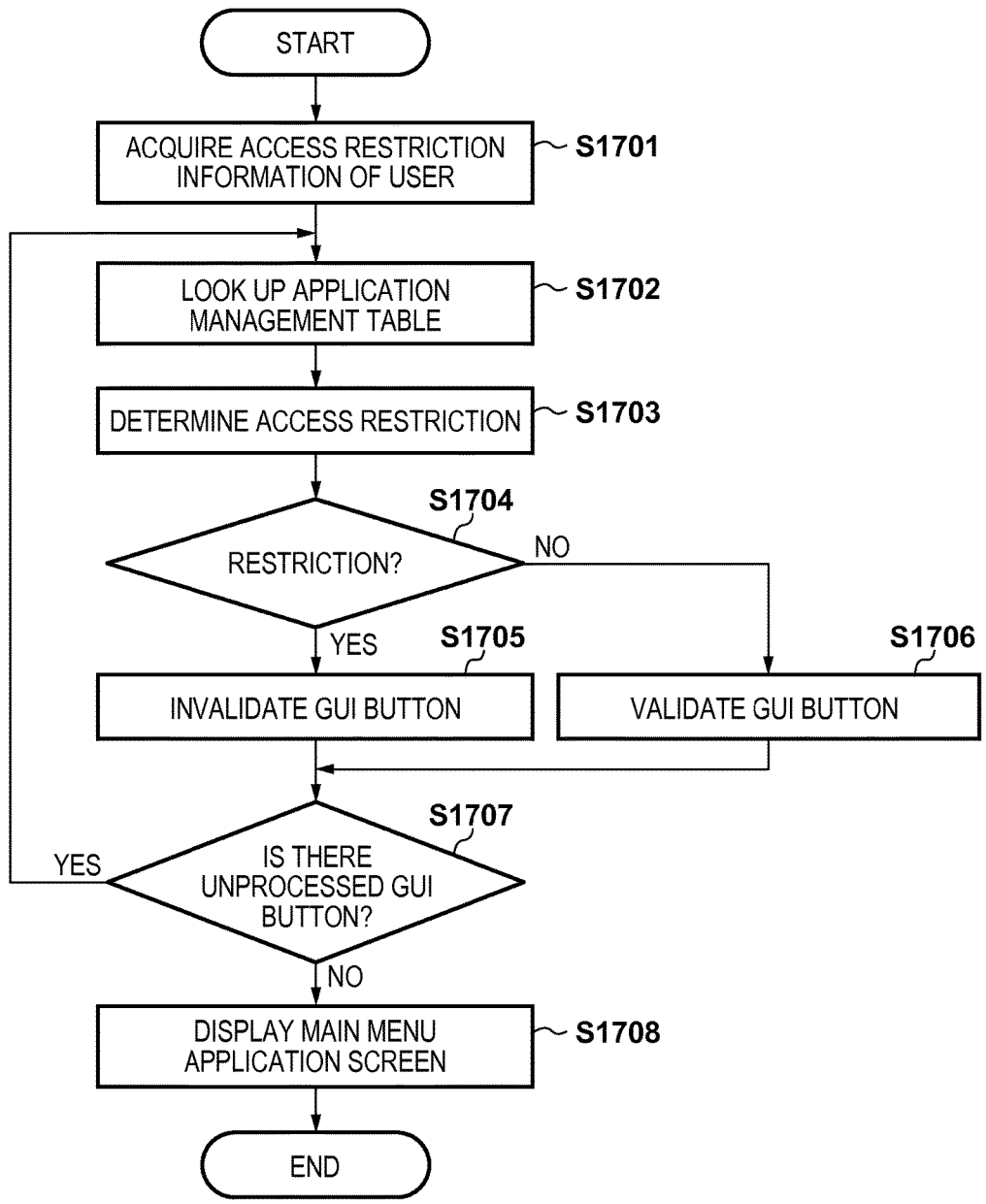
FIG. 17 is a flowchart showing the procedures of access restriction execution processing.

Step S1606 is a menu application display step. If it is determined that the authentication has succeeded, a menu application screen for using the function of the MFP 110 by the user is displayed, and the processing in FIG. 16 ends. In this step, processing of validating and invalidating GUI buttons, which will be described later with reference to FIG. 17, is executed based on access restriction information of the user. Step S1607 is an error message display step. The CPU 201 displays, on the authentication screen 1400, a message representing, by an error message, that the authentication has failed. Then, the process returns to the authentication screen display step.

FIG. 17 is a flowchart showing the procedures of access restriction execution processing by the authentication application 1040. Each process in FIG. 17 is implemented by, for example, loading a program stored in the ROM 202 to the RAM 203 and executing it by the CPU 201 of the MFP 110.

Step S1701 is a user access restriction information acquisition step. In this step, the access management unit 1041 acquires access restriction information of an authenticated user from the access restriction information table 1300 stored in the HDD 204. Step S1702 is an application management table reference step. The CPU 201 refers to function category information associated with a GUI button by looking up the application management table 1100 managed by the application management unit 1020.

Step S1703 is an access restriction determination step. In this step, whether to perform the access restriction on the GUI button is determined by referring to the function category information associated with the GUI button and the access restriction information of the user that has been acquired in step S1701. In step S1704, if it is determined in accordance with the contents determined in step S1703 that the access is restricted, the process advances to GUI button invalidation step S1705. If it is determined that the access is not restricted, the process advances to GUI button validation step S1706.

Step S1707 is an unprocessed GUI button determination step. The CPU 201 determines whether there is a GUI button for which determination of the access restriction on the menu application 1030 has not been performed yet. If the CPU 201 determines that determination of the access restriction has been executed for all GUI buttons, the process advances to menu application screen display step S1708. If the CPU 201 determines that there is an unprocessed GUI button, the process returns to application management table reference step S1702.

Step S1708 is a menu application screen display step. The CPU 201 displays the menu application screen in FIG. 15 on the operation unit 111 subsequently to the authentication screen 1400, and ends the processing in FIG. 17.

Figure 18:
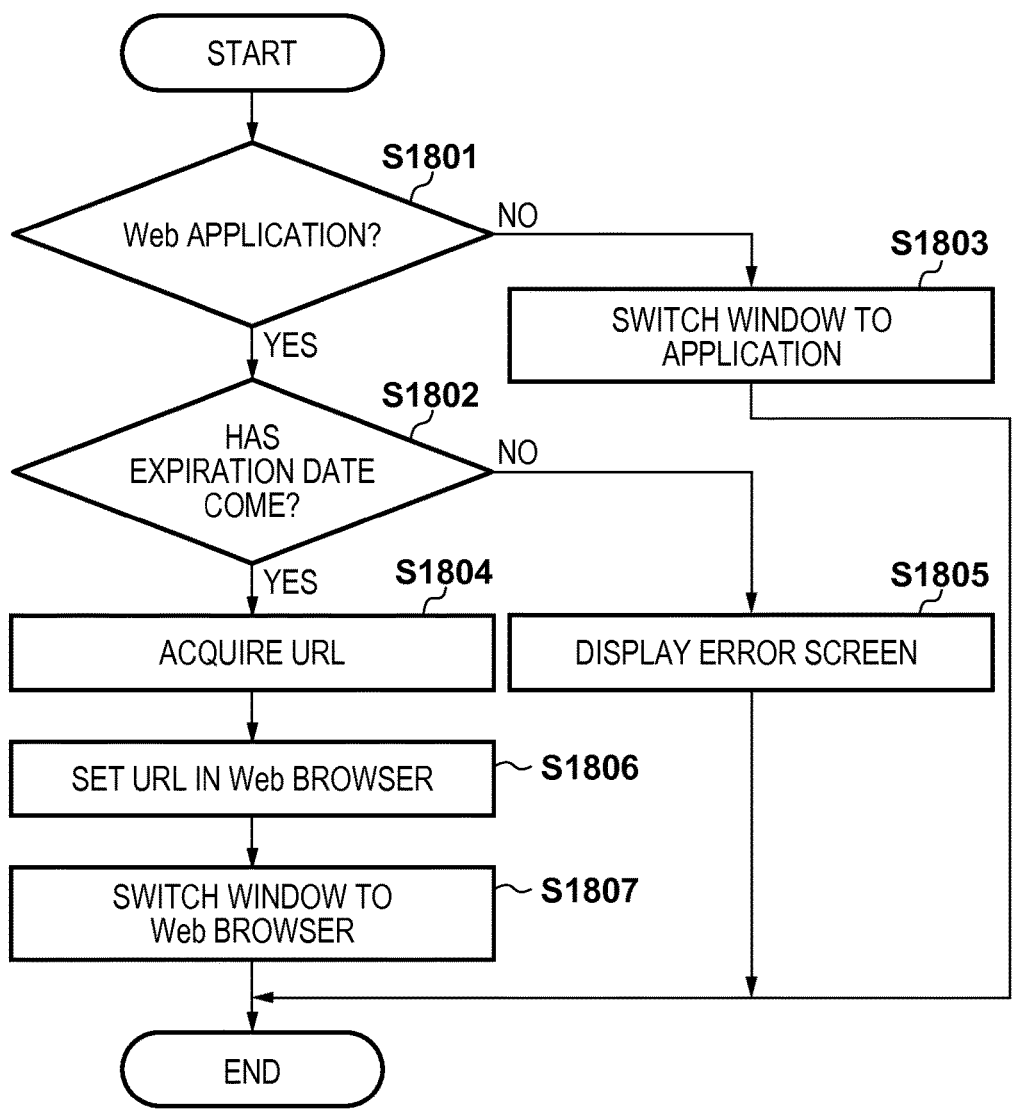
FIG. 18 is a flowchart showing the procedures of display processing of the contents of a web application.

FIG. 18 is a flowchart showing the procedures of processing from pressing of the GUI button 1502 by the user up to display of the contents of the web application 900 by the web browser 1000. Each process in FIG. 18 is implemented by, for example, loading a program stored in the ROM 202 to the RAM 203 and executing it by the CPU 201 of the MFP 110. This processing is started when, for example, the user presses the GUI button 1502 displayed on the menu application 1030.

Step S1801 is a step of determining which of a web application and an MFP application is an application corresponding to the pressed GUI button. If it is determined that the application is a web application, the process advances to step S1802. If it is determined that the application is an MFP application, the process advances to step S1803.

Step S1802 is an expiration date determination step. The menu application 1030 performs confirmation of a license with respect to the application management unit 1020. The application management unit 1020 confirms the expiration date of the target application ID by looking up the application management table 1100 shown in FIG. 11. The current time of the MFP 110 and the expiration date in the column 1104 are compared, and if it is determined that the current time has passed the expiration date of the license of the target application, the process advances to step S1805. If it is determined that the current time has not passed the expiration date, the process advances to step S1804.

Step S1804 is a URL acquisition step. The menu application 1030 acquires the URL of the web application from the application management unit 1020. Step S1805 is an error screen display step. When the process advances to this step, the license has expired, so the menu application 1030 displays an error screen, and the processing in FIG. 18 ends.

In step S1806, the application management unit 1020 sets the URL acquired in step S1804 in the web browser 1000. In step S1807, the application management unit 1020 switches the display of the operation unit 111 from the menu application 1030 to the GUI window of the web browser 1000, and the processing in FIG. 18 ends.

Figure 19:
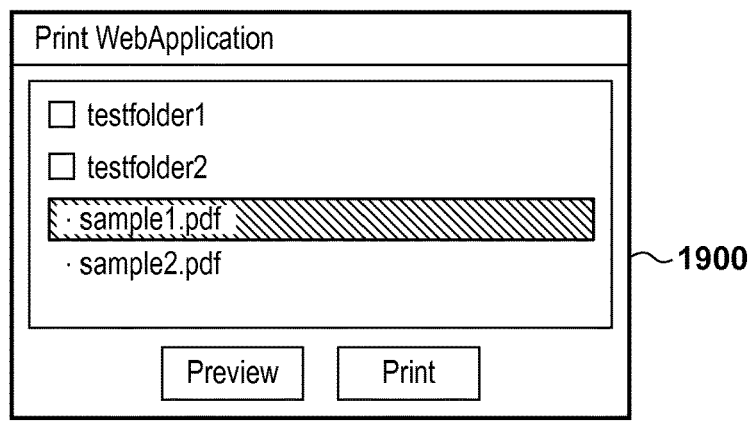
FIG. 19 is a view showing a UI screen displayed when a GUI button is pressed.

FIG. 19 is a view showing an example of a UI screen 1900 displayed on the operation unit 111 when the user presses the GUI button 1501 displayed on the menu application 1030 of the MFP 110 according to this embodiment.

Figure 20:
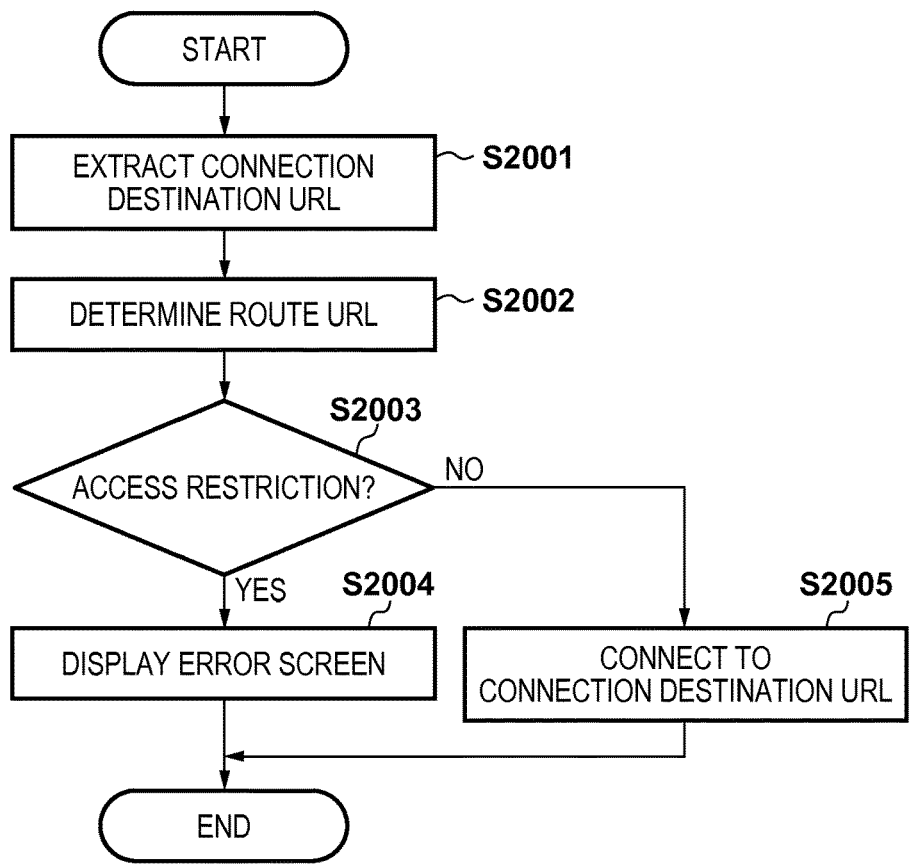
FIG. 20 is a flowchart showing the procedures of access processing to the connection destination URL of a web browser.

FIG. 20 is a flowchart showing the procedures of processing by the web browser 1000 and the access management unit 1041 when the web browser 1000 accesses a connection destination URL. Each process in FIG. 20 is implemented by, for example, loading a program stored in the ROM 202 to the RAM 203 and executing it by the CPU 201 of the MFP 110. This processing is executed every time the web browser 1000 transits to another web page during a link to a web application or during processing.

Step S2001 is a step of extracting a connection destination URL. The web browser 1000 confirms URL information of the connection destination (transition destination) in this step. Step S2002 is a route URL determination step. The web browser 1000 determines whether the route URL held in the application management table 1100 includes the connection destination URL extracted in step S2001.

Step S2003 is an access restriction determination step. If the web browser 1000 determines in step S2002 that the route URL includes the connection destination URL, it specifies the target application. Further, the web browser 1000 inquires of the access management unit 1041 whether the target application is an access restriction target. The access management unit 1041 refers to the access restriction information table 1300 and the function category information 1107 of the target application held in the application management table 1100. Then, the access management unit 1041 determines whether to execute the access restriction on the target application. More specifically, it is determined which of Permit and Deny is set as the function category information of the target application. If it is determined that Permit is set, it is determined that the access is possible. If it is determined that Deny is set, it is determined that the access is impossible.

Step S2004 is an error screen display step. If it is determined in step S2003 that the access is impossible, the web browser 1000 displays an error screen on the screen display unit 1003 of the web browser 1000, and the processing in FIG. 20 ends without connecting to the connection destination URL. Also, if it is determined in step S2002 that the route URL held in the application management table 1100 does not include the connection destination URL extracted in step S2001, the processing in step S2004 may be performed. Alternatively, access control for the URL may be executed.

Step S2005 is a step of connecting to a connection destination URL. The web browser 1000 connects to the connection destination URL via the communication unit 1001, and the processing in FIG. 20 ends.

In this embodiment, first, a dummy application and a license need to be installed to access a web application. The dummy application includes function category information about a function implemented by the web application, and connection destination URL information. That is, only when the license file and the dummy application are installed, the web application can be accessed from the operation unit of the information processing apparatus. Further, the access restriction on a GUI button on the menu application is executed based on access restriction information of a user and based on user authentication, and function category information. As a result, the access restriction on the GUI button can be executed in accordance with a function implemented by the web application. The access restriction can be executed so that the user can instruct execution of only a specific web application.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-212883, filed Oct. 17, 2014, which is hereby incorporated by reference herein in its entirety.

What is claimed is:

1. An information processing apparatus for executing a Web application, the information processing apparatus comprising:
   a memory storing instructions; and
   a processor configured to implement the instructions to execute a plurality of tasks, including:
      a registration task that registers function information, which indicates a function of the information processing apparatus, of each of a plurality of applications, including:
         an application installed and executable in the information processing apparatus; and
         the Web application;
      an acquisition task that acquires user authority information corresponding to the function associated with the function information registered by the registration task;

a first determination task that determines, based on the user authority information acquired by the acquisition task, whether execution of an application by a user corresponding to the user authority information is permitted;

a display control task that controls user access to a user interface (UI) for instructing execution of the application based on a determination result of the first determination task;

an acceptance task that accepts a license file of an application to be executed in the information processing apparatus and a license file of an application for executing the Web application of a server; and a second determination task that determines, based on the received license file, whether or not each of the application to be executed in the information processing apparatus and the application for executing the Web application of the server is usable.

2. The apparatus according to claim 1, wherein in a case where the first determination task determines that the execution of the application by the user is not permitted, the display control task controls the UI not to accept an operation of instructing execution of the application by the user.

3. The apparatus according to claim 1, wherein:
the plurality of tasks includes a file acquisition task that acquires, from a server, a file describing a URL and function of the Web application, and
the registration task registers the URL described in the file acquired by the file acquisition task in association with the UI.

4. The apparatus according to claim 1, wherein:
the UI includes an icon corresponding to a function executable in the information processing apparatus, and
the display control task controls the icon corresponding to the function to be executed by the application not to accept an operation of the icon, for which the first determination task determines that execution of the application by the user is not permitted.

5. The apparatus according to claim 1, wherein:
the plurality of tasks include a storage task that stores, in a storage device, for each of a plurality of functions executable by the information processing apparatus, a table that defines whether execution by each user is permitted,
the plurality of functions include a function to be executed by the application, and
the display control task looks up the table stored in the storage device, and, in a case where the first determination task determines that execution of the application by the user is not permitted, controls the UI to not accept an operation of instructing execution of the application by the user.

6. The apparatus according to claim 1, wherein in a case where the first determination task determines that execution of the application by the user is not permitted, the display control task does not display the UI.

7. The apparatus according to claim 1, wherein the plurality of tasks include a request task that requests, in a case where the first determination task determines that execution of the Web application by the user is permitted and the display control task displays the UI, a server to execute the Web application upon accepting an instruction to execute the Web application.

8. The apparatus according to claim 1, wherein:
the information processing apparatus is an image forming apparatus including at least one of a print function or a scan function, and the Web application is an application using at least one of the print function or the scan function of the image forming apparatus.

9. The apparatus according to claim 7, wherein the server is a web server.

10. The apparatus according to claim 1, wherein the registration task registers a URL of the Web application in association with the UI in a case where installation of an application for executing the Web application is accepted.

11. The apparatus according to claim 10, wherein:
the plurality of tasks include a file determination task that determines whether or not a type of an application is the Web application based on an application file received from a server, and
the registration task registers the URL of the Web application in association with the UI in a case where the file determination task determines that the type of the application is the Web application.

12. The apparatus according to claim 1, wherein the display control task:
validates the UI in a case where the first determination task determines that the execution of the application by the user corresponding to the user authority information is permitted, and
invalidates the UI in a case where the first determination task determines that the execution of the application by the user corresponding to the user authority information is not permitted.

13. The apparatus according to claim 1, wherein:
the plurality of tasks include a displaying task that displays a screen including a plurality of icons, including an icon for instructing execution of an application for executing the Web application and an icon for instructing execution of the application installed and executable in the information processing apparatus, and
the display control task controls the user access to the UI based on a determination result of the first determination task when the screen is displayed by the display task.

14. The apparatus according to claim 1, wherein:
the display control task accesses to a URL of the Web application associated with the UI instructed by the user, and displays a Web page,
the plurality of tasks include a page determination task that determines, in a case where a new Web page is instructed to be displayed while the Web page is displayed, whether or not access by the user to the new Web page is restricted, and
the display control task displays an error screen in a case where the page determination task determines that access by the user to the new Web page is restricted.

15. The apparatus according to claim 14, wherein the page determination task determines whether or not access by the user to the new Web page is restricted, based on the URL registered by the registration unit and an URL of the new Web page.

16. The apparatus according to claim 1, wherein the function information includes information indicating at least a print function of the information processing apparatus or a scan function of the information processing apparatus.

17. The apparatus according to claim 1, wherein the plurality of tasks include an access task that accesses the application of the server, in a case where execution of the application for executing the Web application of the server, determined to be usable by the second determination task, is instructed.

18. A control method executable in an information processing apparatus for executing a Web application, the method comprising:
- a registration step of registering function information, which indicates a function of the information processing apparatus, of each of a plurality of applications, including:
  - an application installed and executable in the information processing apparatus; and
  - the Web application;
- an acquisition step of acquiring user authority information corresponding to the function associated with the function information registered in the registration step;
- a first determination step of determining, based on the user authority information acquired in the acquisition step, whether execution of an application by a user corresponding to the user authority information is permitted;
- a display control step of controlling user access to a user interface (UI) for instructing execution of the application based on a determination result of the first determination step;
- an acceptance step of accepting a license file of an application to be executed in the information processing apparatus and a license file of an application for executing the Web application of a server; and
- a second determination step of determining, based on the received license file, whether or not each of the application to be executed in the information processing apparatus and the application for executing the Web application of the server is usable.

19. A non-transitory computer-readable storage medium storing a program executable by a computer to execute a method for executing a Web application, the method comprising:
- a registration step of registering function information, which indicates a function of the information processing apparatus, of each of a plurality of applications, including:
  - an application installed and executable in the information processing apparatus; and
  - the Web application;
- an acquisition step of acquiring user authority information corresponding to the function associated with the function information registered in the registration step;
- a first determination step of determining, based on the user authority information acquired in the acquisition step, whether execution of an application by a user corresponding to the user authority information is permitted;
- a display control step of controlling user access to a user interface (UI) for instructing execution of the application based on a determination result of the first determination step;
- an acceptance step of accepting a license file of an application to be executed in the information processing apparatus and a license file of an application for executing the Web application of a server; and
- a second determination step of determining, based on the received license file, whether or not each of the application to be executed in the information processing apparatus and the application for executing the Web application of the server is usable.

* * * * *